Figures 1, 3, 4:
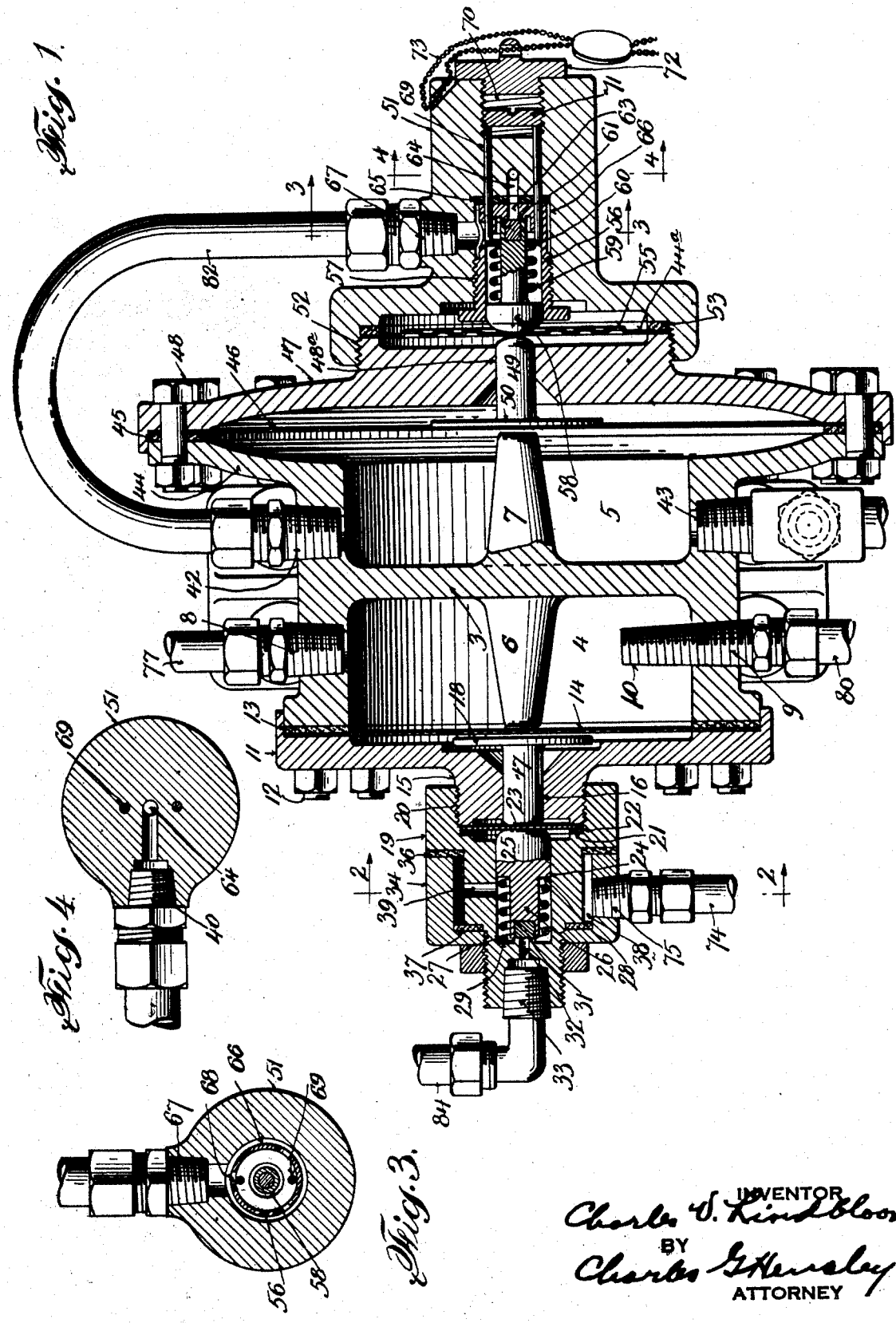

Oct. 30, 1934.  C. V. LINDBLOOM  1,978,465
PRESSURE REDUCING VALVE
Filed Oct. 17, 1931  3 Sheets-Sheet 1

INVENTOR
Charles V. Lindbloom
BY
Charles G. Hensley
ATTORNEY

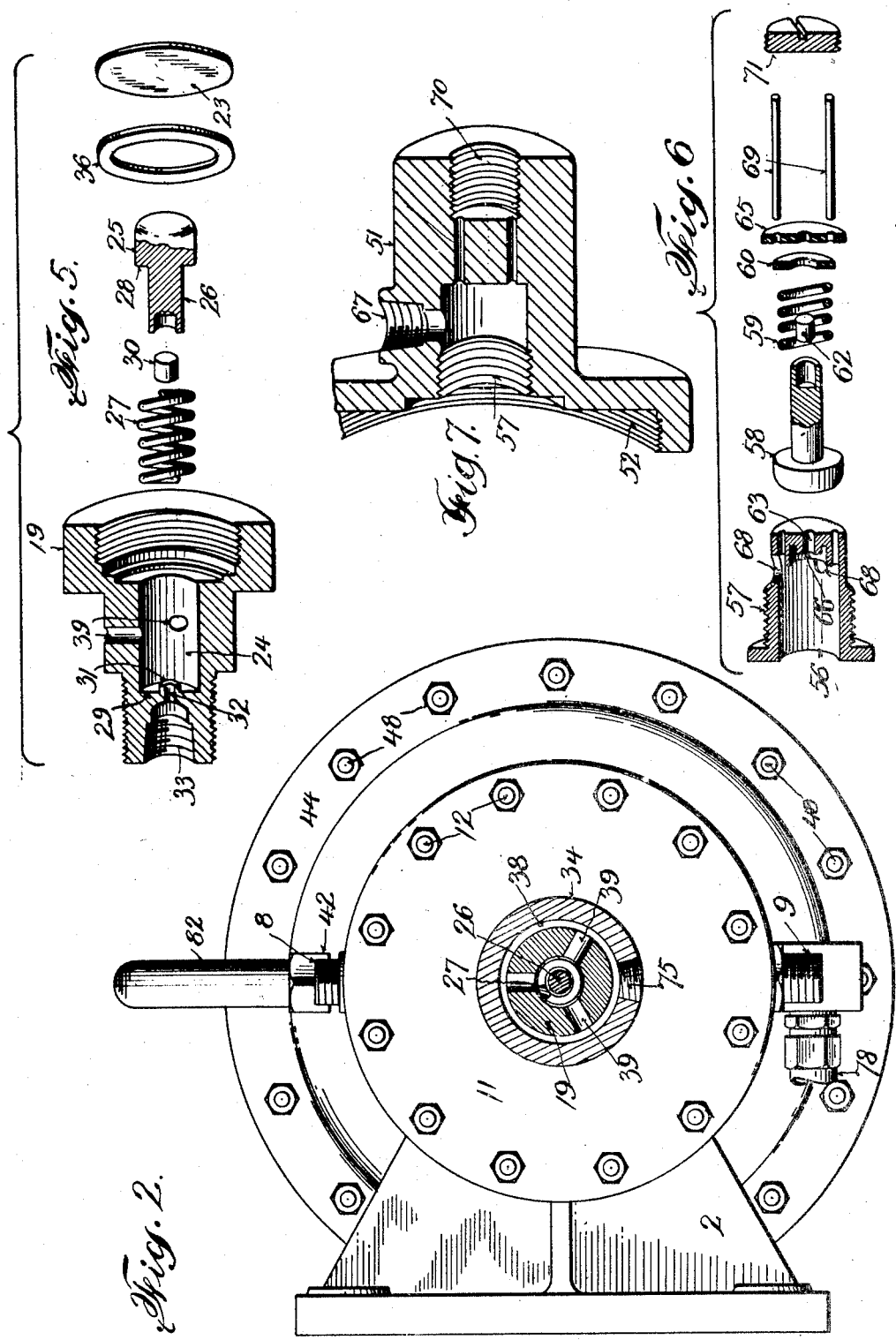

Oct. 30, 1934.  C. V. LINDBLOOM  1,978,465
PRESSURE REDUCING VALVE
Filed Oct. 17, 1931  3 Sheets-Sheet 3

Patented Oct. 30, 1934

1,978,465

UNITED STATES PATENT OFFICE 1,978,465

PRESSURE REDUCING VALVE

Charles V. Lindbloom, Cranford, N. J., assignor to Hi-Heat Gas Co. Inc., New York, N. Y., a corporation of New York Application October 17, 1931, Serial No. 569,531

7 Claims. (Cl. 50—23)

In my Patent No. 1,908,431, issued May 9, 1933, I show and describe a pressure reducing valve and the subject matter of the present application is intended to accomplish the results accomplished with that device, and in addition to be more effective in certain respects, as will be hereinafter pointed out.

Prior to the invention of the device shown in my prior patent there was no practical apparatus devised for handling what is known as wet or wild gas, which is a natural product of wells and which is both plentiful and cheap, as well as rich in B. t. u.'s. This gas is usually supplied to points of consumption in tanks, bottles or containers with the gas in the liquid phase of a pressure of about seventy pounds at 70° F. Where the gas is thus supplied in liquid phase it has been difficult if not impossible, to reduce the pressure and to expand the fluid into the vapor phase so that it is finally reduced to a comparatively low pressure, say six ounces, suitable for feeding to the burners of a gas stove and other consuming appliances. In my said prior patent I showed a device which is adapted to reduce the gas to the vapor phase, and to supply it for consumption at a low pressure.

It has been found, however, that there are a number of advantages derived from reducing the gas from its higher pressure to its lowest pressure in a multiple of stages instead of one stage, and in the present case I have illustrated a pressure reducing valve which, combined with suitable expansion chambers, reduces the pressure in two distinct stages. In the first stage the gas may be received in the liquid phase, the inlet being controlled automatically, and the pressure reduced say from seventy pounds down to about fifteen or twenty pounds. After a second expansion action the pressure, by means of a second valve, is reduced to the pressure suitable for supply to burners which may be, say, six ounces. The gas is then suitable for burning in ordinary burners such as those on the market designed for burning gas furnished by municipal gas supplies. By utilizing the present device any of the ordinary gas appliances on the market may be operated with the k'nd of gas referred to above.

In the present case I have shown a single valve body containing a plurality of reducing valves operating as above set forth, and this single valve body is divided off by a partition which separates the interior of the body into two compartments, each having a diaphragm subjected to the pressure of the gas, each diaphragm controlling one of the valves which reduce the pressure of the gas. This simplifies the construction of the valve body and reduces it to a single casting to which the various operating parts are connected.

In my said prior patent the gas which acts upon the controlling diaphragm is more or less static, i. e., it does not flow through the diaphragm chamber but merely exerts a variation in the pressure, the gas being more or less static within the chamber.

In the present case the diaphragm is acted upon by the moving or travelling gas, so that the actuation of the controlling diaphragm is more nearly responsive to the actual pressure of the gas while moving and the variations of control will correspond more nearly with the gas after it has undergone expansion. Where all of the features of my invention are utilized; that is, where at least two diaphragms are used for controlling the reducing valve, both diaphragms will be actuated by the travelling gas rather than by gas in static state.

Another object of my invention is to admit the fluid from the point of supply so that the valve which admits the fluid will act on the latter while it is in the liquid phase, the valve and its seat being surrounded by fluid in the liquid phase, thereafter escaping from the valve chamber and expanding subsequently into the vapor phase. By having the admitting valve, which is the first reducing valve, and its seat, surrounded by liquid, there is no likelihood of the channels freezing up and clogging the flow of the fluid. It is well known that the type of gas referred to will cause a freezing action either of moisture in the gas or moisture in the surrounding air if released suddenly while in the liquid phase, forming frost or ice which tends to clog the passages.

This difficulty is averted in the present case by having the first reducing valve and its seat surrounded by the fluid in the liquid phase. Usually the gas is entirely expanded to the vapor phase by the time it reaches the second reducing valve, so that the freezing action referred to is not liable to occur near this valve.

Another object of my invention is to provide a combination wherein the fluid, after passing through the first reducing valve, is expanded in the expansion chamber or coil and is then conducted to the diaphragm chamber to act on the diaphragm which controls the operation of the said first reducing valve; after which the fluid is further expanded in a second expansion chamber or coil and is then conducted to the second pressure reducing valve and is then conducted through the second diaphragm chamber where it acts on the second diaphragm to control the operations of the second pressure reducing valve. This combination results in a very accurate and perfect control of the fluid and as above set forth, it assists in preventing the formation of frost which might clog the passages and render the device inoperative, or irregular in its action.

Another object of the invention is to provide simple means for regulating the pressure reducing valve in order to regulate the final or service pressure of the gas and this device is such that it may be locked and sealed to prevent the same being tampered with.

Another object is to provide diaphragms of relatively different areas for controlling the operation of the two pressure reducing valves in order to have a larger diaphragm acted upon by the gas after its second reduction in pressure.

The diaphragms which are controlled or acted upon by the fluid are adapted to close the pressure reducing valves against the action of the incoming fluid, the valves being opened by suitable springs and by the gas pressure.

The outlet for the fluid from the first diaphragm chamber is adapted to receive the fluid from a point above the bottom, so that if any of the fluid is in the liquid phase when it enters this chamber it will be temporarily held and accumulated while the vapor only discharges from this chamber; in order that the fluid will be all in the vapor phase when it enters the second expansion chamber. The conversion of any such liquid in the vapor phase in the diaphragm chamber will cause the pressure to be maintained or built up to hold the diaphragm with the first reduction valve in closed position until the portion of the fluid which is in the liquid phase in this diaphragm chamber has been worked off. Other features and advantages will be apparent from the following detailed description of my invention.

Figure 8:
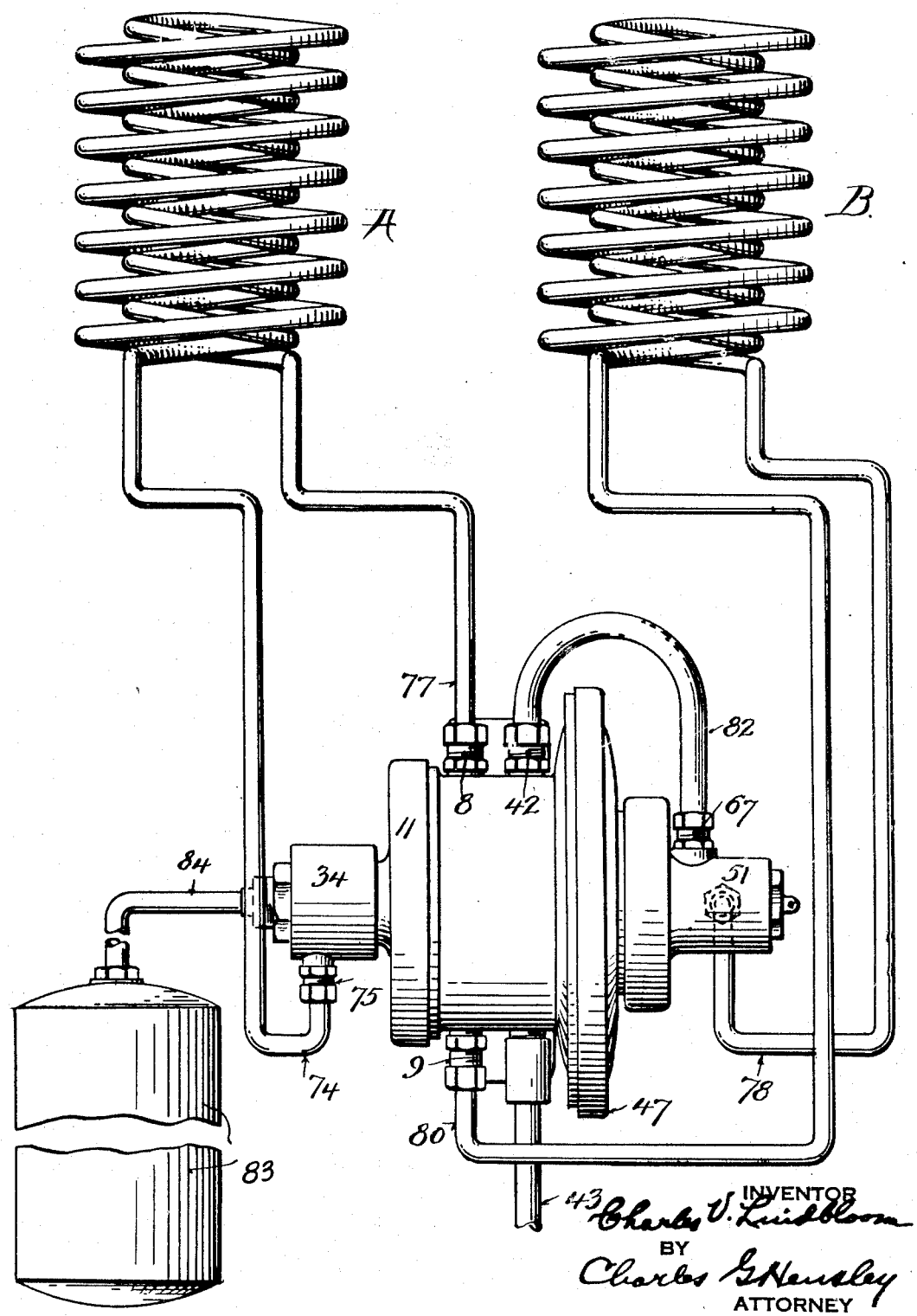

In the drawings forming part of this application,

Figure 1 is a vertical, sectional view through the middle of a pressure reducing valve embodying my invention in the preferred form, Figure 2 is a sectional view taken on the line 2—2 of Figure 1, Figure 3 is a sectional view taken on the line 3—3 of Figure 1, Figure 4 is a sectional view taken on the line 4—4 of Figure 1, Figure 5 is a detailed, assembly view of parts of one of the reducing valves, Figure 6 is a similar view of parts of the other reducing valve, Figure 7 is a vertical, sectional view through the cap or housing in which the second reducing valve is mounted, and Figure 8 is a diagrammatic view showing the relation of the expansion chambers or coils to the reducing valve.

The valve body 1 is shown as a single casting having a bracket 2 at one side thereof by which the valve body may be mounted on a suitable support such as a cabinet as illusrated in my copending application Serial No. 569,532; in fact, the present device may be bodily incorporated in the combination shown in that application and cross reference may be made thereto for a description of a complete gas appliance of which the present invention may form a part. The valve casing 1 is shown as provided with a dividing wall 3 vertically disposed and dividing the valve body off into two separate diaphragm chambers 4 and 5 respectively, which are not directly in communication with each other. This wall is also shown as provided with oppositely extending posts 6, 7 to limit the extreme thrust of the central portions of the two diaphragms to be hereinafter described.

I have shown certain connections mounted on the valve body for admitting and discharging the fluid as follows: There is a connection 8 at the upper side of the first diaphragm chamber 4 to which fluid is admitted to this chamber; and there is a connection 9 at the lower side of this chamber through which the fluid is discharged. The fluid, while present in the chamber, acts on the first diaphragm in the manner hereinafter described. The outlet connection 9 of this chamber is preferably carried upwardly into the chamber, as shown at 10 so that if any part of the fluid is in the liquid phase it will collect at the lower portion of this chamber and will not pass out through the connection 10 until it is converted into the vapor phase and can enter this discharge member.

The valve body is formed with an open side to the chamber 4 and this side is closed by means of a head 11 which is bolted to the valve body by bolts 12 with suitable packing 13 arranged between the head and the valve body to prevent leakage of the fluid from the chamber 4. Between this packing or gasket and the rim of the head 11 there is clamped a diaphragm 14, preferably of metal, which forms a flexible wall for one side of the chamber 4. The diaphragm is adapted to be flexed in one direction by the fluid under pressure in the chamber 4 and to be moved in an opposite direction by spring action, as will be described.

The head 11 has a boss 15 formed thereon at its center and this boss is provided with a central bore 16 in which the plunger 17 is adapted to slide freely. This plunger has an enlarged head 18 on one end, which engages the outer surface of the central portion of the diaphragm 14 and it is adapted to move back and forth in the bore 16 in accordance with the movements of the central portion of the diaphragm.

The boss 15 is provided with an exterior thread onto which the coupling member 19 is adapted to be screwed by means of the thread 20. This coupling member has a recess 21 in which there is seated a compressible gasket 22 and between this gasket and the end of the boss 15 there is clamped a second diaphragm 23 which is preferably of smaller area than the one first described. This smaller diaphragm is adapted to be engaged by the end of the plunger 17 which is opposite to the head 18 so that the movements of the larger diaphragm 14 will be transmitted to the smaller diaphragm and conversely, movements of the smaller diaphragm are transmitted to the larger one.

The coupling member 19 which also serves as a valve body, is provided with a bore 24 disposed at right angles to the plane of the diaphragms and opposite the central portion of the smaller diaphragm; and within this bore there is a valve 25 which is adapted to slide freely therein, one end of this valve resting against the face of the smaller diaphragm 23 opposite to the face which is engaged by the plunger 17. This valve body is reduced in diameter at 26 to provide a space within the bore 24 for a coiled spring 27 which surrounds the smaller portion of the valve and is compressed between the shoulder 28 of the valve and the end wall 29 of the bore 24. This spring tends to urge the valve body 25 to the right in Figure 1, or in the opposite direction to the movement caused by the pressure of the fluid in the chamber 4.

The valve member has a packing 30 set into a socket in the end thereof and this packing is adapted to seat against the valve seat 31 which is formed centrally of the member 19. There is a cap 34 threaded at 35 onto one end of the member 19, and the packing rings 36, 37 prevent the escape of fluid from this cap. There is a port 32 extending through the valve seat member and this is in communication with the connection 33. An annular space is formed as shown at 38 between the interior of cap 34 and the exterior of a portion of the member 19 in which fluid may collect for discharge through the connection 75. This annular space is in communication with the bore 24 through the lateral ports 39 so that the fluid admitted by the valve 25 first enters the bore 24 and then passes through the ports 39 into the annular chamber 38 and thence passes out through the connection 75.

On the right hand side of the device shown in Figure 1 there is a diaphragm chamber 5 formed in the valve body on one side of the dividing partition 3 as stated above.

Fluid is introduced into this chamber through the coupling 42 and it discharges through the coupling 43 and while in the chamber it affects another or second controlling diaphragm. I have shown the valve body as spreading or flaring out at 44 the outer edge being provided with a seat against which the packing ring 45 is compressed. Against the outer right hand face of this packing ring engages the outer edge of a diaphragm 46 shown vertically disposed. This diaphragm is preferably larger than the first controlling diaphragm 14 because the fluid which enters the chamber 5 is at lower pressure than that which enters the chamber 4 and the large diaphragm is desirable to obtain sufficient actuating force to operate the second pressure reducing valve.

There is a cap member 47 which is bolted to the flaring portion 44 of the valve body by means of the bolts 48 so that the diaphragm and the packing ring 45 are tightly clamped between the cap and the valve body to form a fluid tight joint between the diaphragm and the body 1. The cap member 47 has a central bore 48a in which the plunger 49 is adapted to slide freely, this plunger having a head 50 resting against the outer surface of the diaphragm 46 so that the plunger may be moved by the diaphragm. There is a valve body 51 which is threaded at 52 onto a projection or boss formed on the cap 47 and between this body and the boss there is clamped a packing ring 53 and the outer portion of a diaphragm 44, forming a fluid-tight joint.

This diaphragm performs a similar function to the diaphragm 23 but it is shown as larger in diameter than the former and provided with a series of concentric corrugations 55 to permit the center of this diaphragm to flex with less resistance than the first diaphragm, in order to be responsive to the lighter fluid pressures in the chamber 5.

There is a casing 56 threaded into a bore in the body 51 as shown at 57 and this casing has a central bore in which the valve member 58 is adapted to slide freely. The head of this valve body rests against the surface of the diaphragm 44 on the opposite side to the plunger 49 so that it may flex the central portion of this diaphragm and also be moved by the latter.

This valve member is reduced in diameter to provide an annular space between it and the wall of the casing 56 and within this space there is a coiled spring 59 which is compressed between the head of the valve and an adjustable collar 60 which fits around the reduced portion in the valve and forms an abutment for one end of the coiled spring. One end of the casing 56 is provided with a valve seat 61 facing the valve and the valve has a packing 62 seated in a socket in one end thereof, which is adapted to seat against the valve seat 61.

There is a port 63 extending through the valve seat and communicating with a lateral port 64 in the body 51. I have shown a packing ring 65 compressed between one end of the casing 56 and a wall of the body 51 to form a fluid-tight connection between the member 56 and the member 51. There is an annular chamber 66 formed between the right hand end of the casing 56 and the bore of the member 51 in which fluid collects for discharge through the coupling 67. This annular chamber is in communication with the space around the valve 58 by means of lateral ports 68 and in this respect the construction corresponds with the first described reducing valve.

There are adjusting rods 69 which slide in apertures formed in the body 51 and these rods also pass through apertures in the packing 65 and apertures in the end of the shell 56 the ends of the rods abutting against the adjustable washer 60.

There is a threaded aperture 70 extending inwardly from the end of the body 51 and in line with the several rods 69. The nut 71 which is adapted to be screwed into this opening presses against the outer ends of the rods 69 and by adjusting this nut the collar 60 may be adjusted along the valve member to exert more or less pressure on one end of the valve spring 59 and thereby control the action of the valve 58 to determine the pressure required in the chamber 5 to unseat this valve from the seat 61. The outer end of the aperture 70 may be closed by means of a plug 72 and this plug may be sealed by means of the chain and seal 73 to prevent unauthorized removal of the plug, so that unauthorized persons cannot tamper with the adjusting nut 71.

There is a pipe 74 connected to the connection member 75 and this pipe leads to an expansion chamber which is shown in the form of a coil 76 so that the fluid conducted to this coil is allowed to expand therein, due to the capacity of the coil. After the fluid passes through this coil it returns by the pipe 77 to the connection 8 on the valve body 1 and it is admitted into the diaphragm chamber 4. After passing through this chamber the fluid passes out through the coupling 9, thence through a pipe 80 to a second expansion chamber shown in the form of a coil 79 so that the fluid may undergo a second expansion after it has effected the operation of the first diaphragm 14.

After the fluid has passed through the coil 79 and been expanded therein it passes by means of the pipe 81 to the coupling 40 through which it is admitted to the port 64 to pass into the chamber surrounding the second pressure reducing valve.

From there the fluid passes through the ports 68 into the annular space 66 and from there it passes out through the coupling 67, thence through the pipe 82 through the coupling 42, and is admitted into the diaphragm chamber 5. While the fluid is in this chamber it acts on the larger diaphragm 46. It leaves this chamber through the coupling 43 and is conducted away by the pipe 78 to be used as fuel in burners or other gas appliances. By the time the fluid discharges into the pipe 78 the pressure will have been reduced to the proper point necessary for direct consumption in gas burning appliances.

*Operation*

It will be understood that the fluid passes through and is controlled by the pressure reducing valves in series so that it undergoes pressure reduction in two separate stages. The fluid is admitted from the source of supply such as the tank 83, through the pipe 84, through the coupling 33, the fluid passing through the port 32, whenever the valve 25 is unseated from the seat 30. The fluid entering this port will pass into the space between the valve 25 and the bore 24 and will then pass out through the lateral ports 39 into the annular space 38. The fluid will be in the liquid phase while it is in the space around the valve 25 in order that there can be no freezing action to interfere with the control operation of the valve.

As long as the space around the valve 25 is flooded with the fluid in the liquid phase, the reducing valve cannot become clogged by freezing of the fluid. When the fluid passes into the annular space 38 there will be a slight expansion due to the increased capacity, but in most cases the expansion will not be sufficient to permit the fluid to be converted to the vapor phase until it has discharged from this annular space 38.

As the fluid discharges from this annular space through the coupling 75 into the pipe 74 it passes through the spirals of the coil A and, due to the increased capacity of this coil, the fluid expands and is converted from the liquid to the vapor phase, either completely or partially. After the fluid passes through this coil it is conducted by the pipe 77 to the coupling 8 and through this it is fed into the diaphragm chamber 4. While the fluid is in this chamber it is acting on one surface of the diaphragm 14 tending to bend this diaphragm to the left of Figure 1.

The movement of the diaphragm under the pressure of the fluid in the chamber 4 causes the plunger 17 to be moved by the diaphragm to the left in Figure 1, and this plunger presses against one side of the diaphragm 23 causing the latter to be flexed, and the movement is transmitted through this diaphragm to the valve 25. If the plunger 17 moves to the left the valve 25 also moves to the left against the opposition of the spring 27 and this is the direction necessary to close this valve against the seat 31.

If the fluid pressure in the chamber 4 is sufficient to completely seat the valve 25 the inlet of the fluid through the port 32 when coming from a source of supply, is entirely shut off and remains so until there is a reduction in pressure in the diaphragm chamber 4. This closing action of the valve 25 is against the pressure of the incoming fluid as well as against the action of the spring 27. Due to the small area of the port 32 the incoming fluid exerts a comparatively light pressure against the valve 25.

The spring 27 exerts a definite pressure on the valve so that a certain predetermined pressure is necessary in the diaphragm chamber 4 to cause the closing of the valve 25. The parts may be so designed that the valve 25 is opened whenever the fluid in the diaphragm chamber 4 goes below say fifteen or twenty pounds or whatever the first stage of reduction is to be. Whenever the pressure in the diaphragm chamber rises the valve 25 is closed and the entrance of fluid from the source of supply is cut off until the pressure in the diaphragm chamber has been reduced by consumption of the fluid. The flow of the fluid through the port 32 when the valve is unseated will be at different rates according to the extent that the valve is opened and this will depend upon how much the pressure is reduced in the diaphragm chamber 4.

The small diaphragm 23 is employed merely as a packing to prevent fluid in the bore 24 from escaping past this diaphragm, but the flexibility of the latter allows the valve 25 to be operated by the plunger 17 and vice versa. This diaphragm 23 is not directly operated by fluid pressure on its surface.

If any of the fluid which enters the diaphragm chamber 4 is in liquid phase it will fall to the bottom of this chamber and will not pass out as liquid but will collect and remain in the lower part of this chamber. Such part of the fluid as is in the vapor phase will pass out through the member 10 the open end of which is above the liquid level; and this vapor will pass out through the coupling 9. As the vapor is conducted away from the chamber 4 any part of the fluid which is in the liquid phase will be obliged to expand into the vapor phase before it discharges from here as this is necessary before the fluid will pass into the member 10.

Whenever there is fluid in the liquid phase in this chamber the pressure will be sufficient to keep the reducing valve 25 closed until the liquid has been converted into vapor in the diaphragm chamber 4 by expansion. This is to insure that all of the fluid is reduced to the vapor phase before it leaves the diaphragm chamber 4.

It will be apparent that the fluid travels through the diaphragm chamber 4 and affects the action of the diaphragm 14 while in active condition rather than as a static pressure.

As the fluid passes from the diaphragm chamber 4 through the connection 9 in the pipe 80 it is conducted to and through the second expansion chamber consisting of the coil B so that after the fluid has acted on the first diaphragm 14 it undergoes a second expansion in the coil B to reduce its pressure. After passing through this second coil and undergoing the second expansion all of the fluid is in the vapor phase, and it enters through the connection 40 into the port 64 and from there it passes through the port 63 into the space surrounding the valve 58 whenever this valve is unseated; and the fluid passes from this space through the ports 68 into the annular space 66 and from there through the coupling 67 and the pipe 82 into one side of the diaphragm chamber 5.

The fluid in this diaphragm chamber acts on one surface of the larger diaphragm tending to bend the central portion of this diaphragm to the right in Figure 1. The diaphragm acts on the plunger 49 tending to move it towards the right, and the plunger presses on one side of the smaller diaphragm 44 so that the movement is transmitted through this diaphragm to the valve 58 tending to move this valve to the right and to seat it against the valve seat 61.

If the pressure in the diaphragm chamber 5 is sufficient to close the valve 58 fluid will be temporarily shut off from flowing through the port 64 so that additional fluid will not enter the diaphragm chamber 5 until the pressure in this chamber has been reduced by the consumption of fluid taken from this chamber through the connection 43 and the pipe 78.

When the pressure in the diaphragm chamber 5 decreases below the predetermined minimum the spring 59 acting on the valve 58 will act on the diaphragm 44 and the plunger 49 and overcome the pressure on the left hand side of the diaphragm 46 so that the valve 58 is unseated and additional fluid is admitted from the port 64 into the space 66 to travel over to and be admitted in the diaphragm chamber 5. Whenever the fluid thus admitted to the diaphragm chamber 5 builds up to a pressure which will act on the diaphragm 46 and overcome the resistance of the spring 59 the valve 58 will again be closed to shut off the entrance of fluid.

It will be apparent from what has been said that the second pressure reduction brings the gas pressure down to the desired low point at which it is to be consumed, and that the second valve is automatically controlled by the pressure of the fluid in the diaphragm chamber 5 so that the fluid is fed to this chamber in accordance with the rate at which it is consumed and the final pressure of the fluid is maintained substantially uniform regardless of the rate at which the fluid is consumed. Naturally, the faster the fluid is taken from the diaphragm chamber 5 the quicker will the pressure on the diaphragm 46 be reduced and the quicker the valve 58 will be opened; and the extent of its opening will be dependent on the movement of the large diaphragm.

Whenever the pressure builds up in the diaphragm chamber 5 it moves the central part of the diaphragm as well as the plunger 49 to the right in Figure 1 and so causes the valve to move towards the seat 61 against the opposition of the spring 59 and against the pressure of the gas entering the port 63. As the pressure of the fluid which enters the diaphragm chamber 5 is much less than the pressure of the fluid in the chamber 4 the second controlling diaphragm is made larger than the first one in order that the second diaphragm may be sensitive to the lower pressures and be sufficient to operate the valve 58. The smaller diaphragm 44 is used merely as a packing to prevent the escape of fluid past the valve 58 so that its function is similar to the diaphragm 23. I have shown this diaphragm 44, however, as being relatively larger and provided with corrugations, so that its central portion may be moved with less energy.

The valve spring 59 may be adjusted for the purpose of regulating the pressure of the gas finally delivered through the pipe 78. This may be done by removing the seal 73 from the plug 72, then removing the plug 72 and by inserting a screw driver in the slot of the nut 71 the latter may be turned in either direction to change the position of the rods 69. They will either be pressed in further or allowed to move outwardly and the collar 60 which abuts against their inner ends will be changed in position accordingly, thereby increasing or decreasing the compression of the spring 59 and regulating the amount of pressure which the gas must exert on the large diaphragm 46 to seat the valve 58. By regulating the pressure of the spring it is possible to control the pressure of the gas which is delivered.

As the device shown in the drawings is intended to be so operated that none of the fluid in the liquid phase will reach the compartment 5 it is not necessary to provide for the accumulation of liquid in this chamber as only fluid in the vapor phase will enter and leave it. The two abutment members 6, 7 are so disposed that if there is no pressure in either diaphragm chamber the springs pressing on the reducing valves cannot bend the central portions of these diaphragms excessively because they will come into contact with the ends of the abutments 6, 7 before the diaphragms can be injured by the spring pressure.

Having described my invention, what I claim is:

1. A device of the character described including a shell having a partition dividing the shell into a plurality of compartments arranged back to back on opposite sides of said partition, heads for the open sides of said compartments, each head having a valve body therein provided with a valve seat, a valve for each of said seats, a diaphragm secured between each of said heads and said body adapted to be acted upon by the fluid in the respective chambers, and means whereby each of said diaphragms acts on said respective valves to close the same for controlling the passage of fluid through said valves.

2. A pressure reducing device, including means forming a plurality of separate diaphragm chambers, a diaphragm associated with each of said chambers, adapted to be acted upon by the fluid in the respective chambers, a valve for controlling the flow of fluid, means whereby the first diaphragm acts on said valve to close the same, an expansion chamber for receiving the fluid from said valve and adapted to deliver the fluid, after expansion, into the first diaphragm chamber, a second expansion chamber adapted to receive the fluid after it has acted upon said first mentioned diaphragm, a second valve for controlling the flow of fluid, and means whereby the same is actuated by said second diaphragm, said second expansion chamber being arranged to deliver the fluid to said second mentioned valve, and means for causing the fluid, after it passes said second mentioned valve, to be delivered into the second diaphragm chamber whereby the fluid in said latter chamber will act on the second diaphragm to control the operation of said second mentioned valve.

3. A pressure reducing device including means forming a plurality of separate chambers, a diaphragm associated with each of said chambers adapted to be acted upon by the fluid in the respective chambers, said diaphragms being of relatively small and larger areas, a valve for controlling the flow of fluid, means whereby the smaller diaphragm actuates said valve, an expansion chamber for receiving the fluid from said valve adapted to deliver the fluid after expansion into the chamber with which said smaller diaphragm is associated, a second expansion chamber adapted to receive the fluid after it has acted upon said smaller diaphragm, a second valve for controlling the flow of fluid, and means whereby the same is actuated by said larger diaphragm, said second expansion chamber being arranged to deliver the fluid to said second mentioned valve, and means for causing the fluid, after it passes said second mentioned valve, to be delivered into the chamber with which said larger diaphragm is associated, whereby the fluid in said latter chamber will act on the larger diaphragm to control the operation of said second mentioned valve.

4. A pressure reducing device, including a body having a wall dividing said body into a plurality of separate chambers, a head for each of said chambers, a diaphragm secured by said heads to the open sides of said chambers adapted to be acted upon by fluid in the respective chambers, a valve for controlling the flow of fluid, means whereby said first diaphragm acts on said valve to close the same, an expansion chamber for receiving the fluid from said first valve and adapted to deliver the same after expansion into the chamber with which said first diaphragm is associated, a second expansion chamber adapted to receive the fluid after it has acted upon said first mentioned diaphragm, a second valve for controlling the flow of fluid, and means whereby the same is actuated by said second diaphragm, said second expansion chamber being arranged to deliver the fluid to said second mentioned valve, and means for causing the fluid, after it passes said second mentioned valve, to be delivered into the chamber with which said second diaphragm is associated, whereby the fluid in said latter chamber will act on said second diaphragm to control the operation of said second mentioned valve.

5. A pressure reducing device including means forming a plurality of separate diaphragm chambers, a diaphragm associated with each of said chambers adapted to be acted upon by fluid in the respective chambers, a valve for controlling the flow of fluid, means whereby said first diaphragm acts on said valve to close the same, an expansion chamber for receiving the fluid in said valve and adapted to deliver the fluid, after expansion, into the chamber with which said first diaphragm is associated, a second expansion chamber adapted to receive the fluid from said first diaphragm chamber at a point remote from the point of entrance of fluid into said chamber, a second valve for controlling the flow of fluid, and means whereby the same is actuated by said second diaphragm, said second expansion chamber being arranged to deliver the fluid to said second mentioned valve, means for causing the fluid, after it passes said second mentioned valve, to be delivered into the said diaphragm chamber whereby the fluid in the latter will act on the second diaphragm to control the operation of said second mentioned valve.

6. A pressure reducing device including means forming a plurality of separate diaphragm chambers, a diaphragm associated with each of said chambers to be acted upon by the fluid in the respective chambers, a valve for controlling the flow of fluid, means whereby said first diaphragm controls the operation of said valve, an expansion chamber for receiving the fluid from said first valve adapted to deliver the fluid, after expansion, into said first diaphragm chamber, a second expansion chamber and means whereby fluid in the vapor phase will be withdrawn from said first diaphragm chamber into said expansion chamber, leaving any fluid in the liquid phase in said first diaphragm chamber, a second valve for controlling the flow of fluid, and means whereby the same is actuated by said second diaphragm, said second expansion chamber being arranged to deliver the fluid to said second mentioned valve, and means for causing the fluid, after it passes said second mentioned valve, to be delivered into the second mentioned diaphragm chamber whereby the fluid in the latter chamber will act on the second diaphragm to control the operation of said second mentioned valve.

7. A pressure reducing device, including means forming a plurality of separate diaphragm chambers, a diaphragm associated with each of said chambers to be acted upon by the fluid in the respective chambers, a reducing valve for controlling the flow of fluid, means whereby said first diaphragm controls said valve, a second valve for controlling the flow of fluid, and means whereby the same is actuated by said second diaphragm, a plurality of expansion chambers, each composed of an inner helical coil and an outer helical coil, so connected that the fluid passes upwardly in the inner coil and thence downwardly in the outer coil, said first expansion chamber being adapted to receive the fluid from said first reducing valve and to be delivered into the first diaphragm chamber, said second expansion coil being adapted to receive the fluid from said first diaphragm chamber and to deliver it to said second reducing valve, and means for delivering the fluid from said second reducing valve into said second diaphragm chamber.

CHARLES V. LINDBLOOM.